Figure 1:
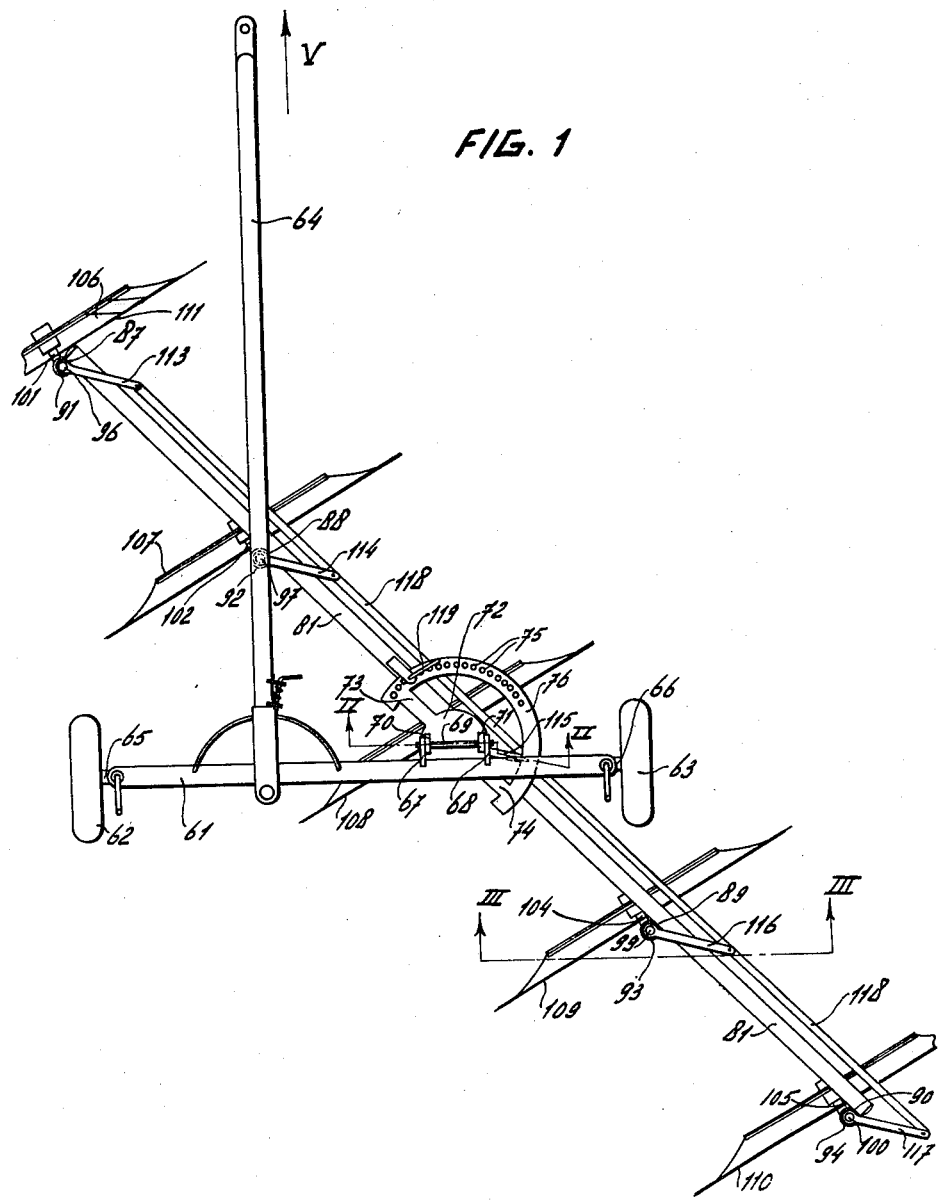

April 26, 1960  C. VAN DER LELY ET AL  2,933,879
RAKING DEVICE WITH ADJUSTABLY MOUNTED RAKING WHEELS
Filed May 9, 1956  3 Sheets-Sheet 1

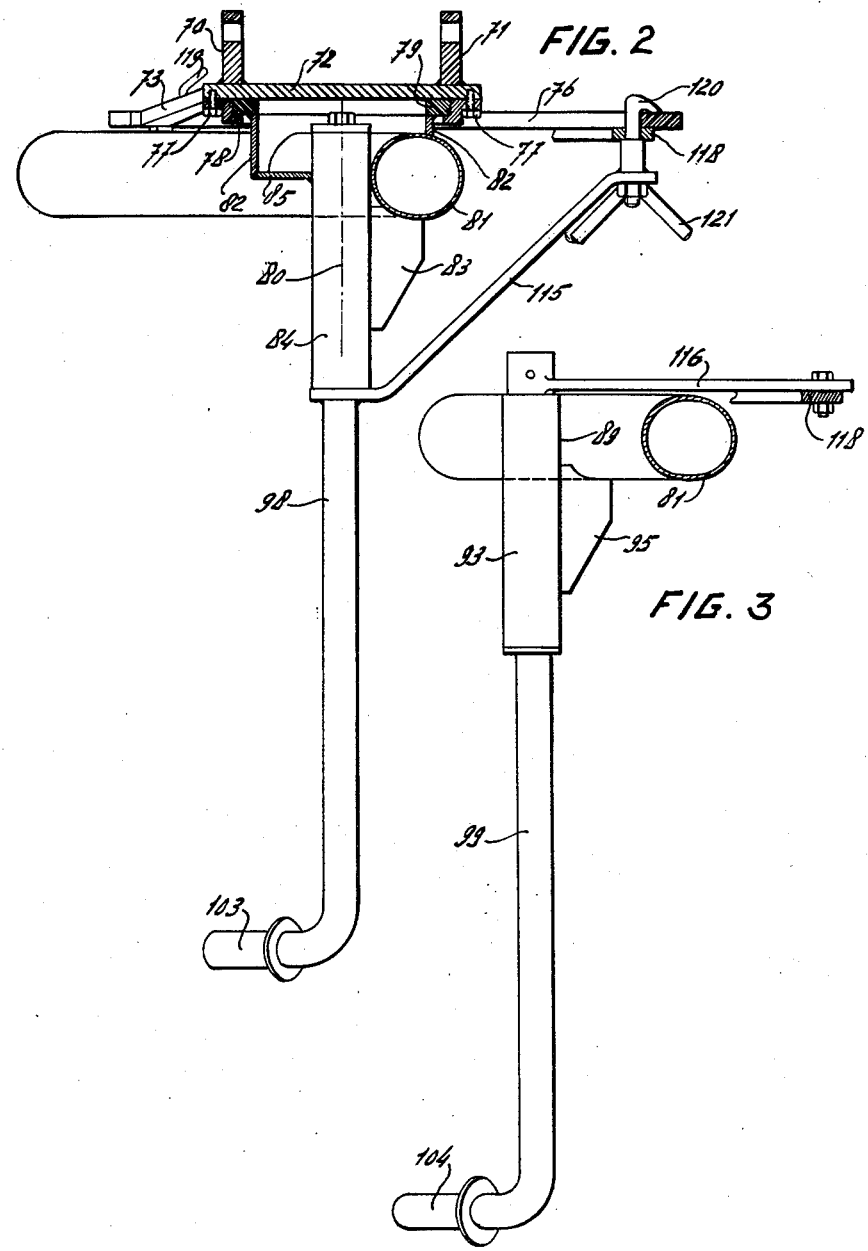

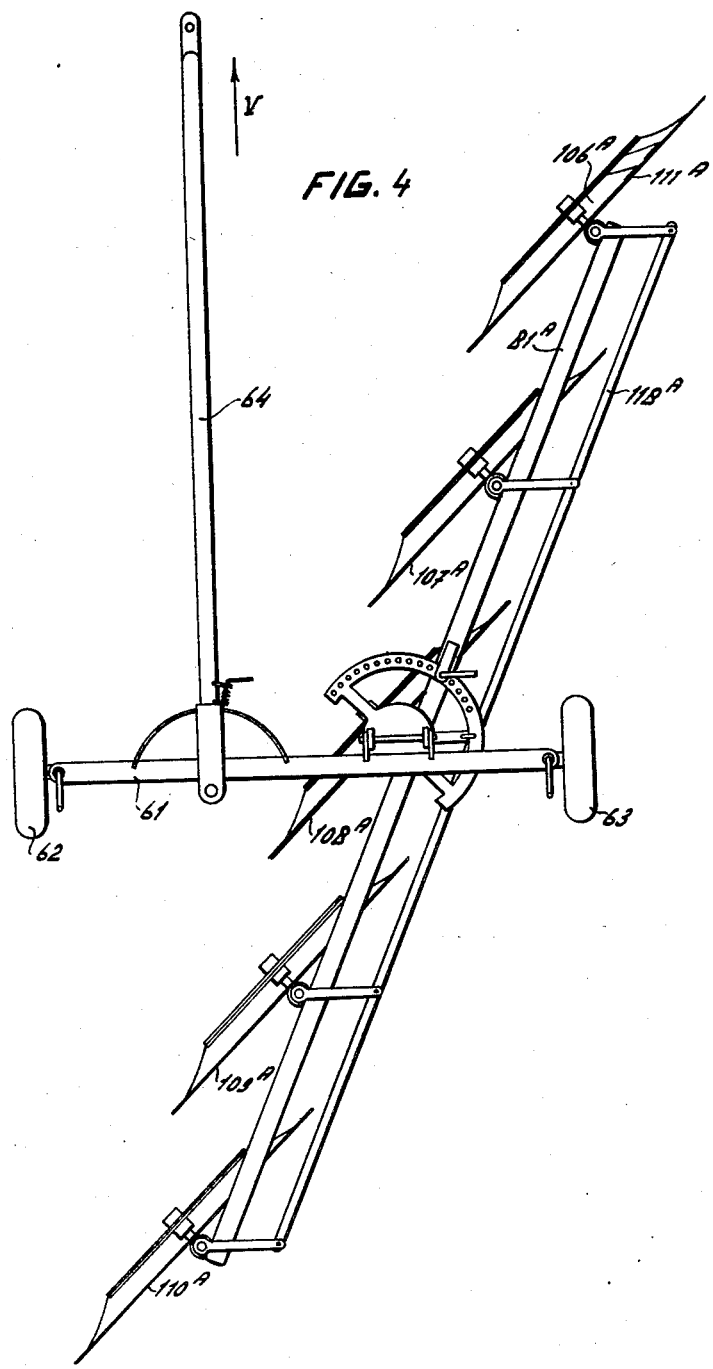

United States Patent Office 2,933,879
Patented Apr. 26, 1960

2,933,879

RAKING DEVICE WITH ADJUSTABLY MOUNTED RAKING WHEELS

Cornelis van der Lely and Ary van der Lely, Maasland, Netherlands, assignors to C. van der Lely N.V., Maasland, Netherlands, a Dutch limited company Application May 9, 1956, Serial No. 583,683

Claims priority, application Netherlands May 14, 1955

7 Claims. (Cl. 56—377)

The invention relates to devices for laterally displacing material lying on the ground, and more particularly to devices of the type comprising a mobile frame to which are attached a number of rake wheels.

It is an object of the present invention to provide an improved device of the above indicated type which is capable of selectively performing different types of raking operations while traveling substantially in a single operational direction.

According to the invention, the improved apparatus comprises a frame which has in a first working position substantially the same travelling direction as in a second working position and in the first working position the mutual position of the associated rake wheels is such that a following rake wheel further laterally displaces material delivered by a preceding rake wheel, the tines of the rake wheels extending rearwardly with respect to the direction of rotation thereof during the use in the first working position.

The present invention will be further explained with reference to the drawing in which:

Fig. 1 shows a plan view of a device according to the invention in the first working position too, Fig. 2 shows an enlarged section according to line II—II in Fig. 1, Fig. 3 is an enlarged sectional view along line III—III in Fig. 1, Fig. 4 is a plan view of the device according to Figs. 1–3 in the second working position.

The device according to Fig. 1 comprises a frame part including a frame member or mobile frame or bridge 61 which is supported by two running wheels 62 and 63 situated considerably lower than said bridge 61 and to which a draw arm 64 is connected to draw frame 61 in a determinable direction of travel V. The axles 65 and 66 of the running wheels 62 and 63 are in alignment. The bridge 61 supports two eyes 67 and 68 in which a horizontal hinge pin 69 is mounted. Two eyes 70 and 71 fixedly connected to a disc 72 are mounted rotatably about the hinge pin 69 (see also Fig. 2). The disc includes two arms 73 and 74 bearing a substantially semi-circular perforated strip 76 provided with holes 75. An adjusting ring 78 (Fig. 2) is secured against the lower side of the disc 72 by means of bolts 77. Ring 78 conjointly with the disc 72 constitutes a bearing for a supporting ring 79 which can be turned about the center line 80 relative to the disc 72. A tubular beam or supplemental frame 81 is fixedly attached to the supporting ring 79 by means of an annular member 82 and to a vertical tube 84 by means of a plate 83. Further, this tube 84 and the annular member 82 are rigidly interconnected by means of a plate 85. Thus, supplemental frame 81 is supported by mobile frame 61 for ground traversing movement by means adapted to permit adjustment of the position of the supplemental frame relative to said mobile frame.

At 87, 88, 89 and 90, the beam 81 fixedly supports vertical tubes 91, 92, 93 and 94 having the same shape as the tube 84. As is shown in Fig. 3 the tube 93 is attached to the beam 81 at 89 partly by means of a plate 95. The vertical tubes 91, 92, 84, 93 and 94 constitute bearings for vertical axles 96, 97, 98 (see Fig. 2), 99 (see also Fig. 3) and 100. The lower ends of said axles are bent horizontally and form horizontal axles or supports 101, 102, 103 (see Fig. 2), 104 (see also Fig. 3) and 105 for the spaced rake wheels 106, 107, 108, 109 and 110 which in Fig. 1 are arranged for a tedding operation. The horizontal axles 103 and 104 on which the rake wheels 108 and 109 are mounted are visible in Figs. 2 and 3. The rake wheels are provided with tines, the extremities 111 of which have a rearward inclination relative to the direction of rotation occurring during operation. The vertical axles 96, 97, 98, 99 and 100 carry means for maintaining the rake wheels in parallel relation and controllably fixed on the supplemental frame 81, said means including arms 113, 114, 115, 116 and 117 which are hingedly connected to a control means or member constituted by a strip 118 parallel to the beam 81. Owing to this, the vertical planes comprising the arms 113–117 always remain parallel, due to which the planes of the rake wheels 106–110 also remain parallel. The beam 81 can be secured in a determinable position with respect to the semi-circular strip 76 by means of a locking means or pin 119 which is put through one of the holes 75. The strip 118 can also be secured in various positions by means of a hook-shaped bolt 120 (Fig. 2) on which fits a fly nut 121 by which the strip 118 is clamped against the semi-circular strip 76, owing to which means the arm 115 is secured in position and the positions of the rake wheels fixed.

For converting the device into a side delivery rake, the nut 121 can be released and the locking pin 119 removed. Then the beam 81 can be placed in the position 81A shown in Fig. 4 and the rake wheels can be turned till they occupy the positions 106A–110A, after which the locking pin 119 and the nut 121 are again employed to fix the positions of the various elements. As thus arranged, the device can be used as a side delivery rake without changing the travelling direction V. In the new position of the rake wheels the tines 111A have a rearward inclination relative to the direction of rotation of the rake wheel, just as was the case in the position according to Fig. 1.

What we claim is:

1. Apparatus for displacing material lying on the ground comprising a mobile frame having a determinable direction of travel, a supplemental frame pivotal on said mobile frame and being supported by the latter for ground traversing movement, a plurality of spaced rake wheels pivotal on said supplemental frame, means operatively associated with said rake wheels and said supplemental frame and maintaining said rake wheels in parallel relation and controllably fixed relative to said supplemental frame, and means operatively associated with said mobile and supplemental frames for fixing the position of the latter relative to said mobile frame whereby the positions of said rake wheels relative to said mobile frame may be adjusted so that said apparatus is capable of selectively performing tedding and side delivery operations.

2. Apparatus for displacing material lying on the ground comprising a draw arm connected to said mobile frame.

3. Apparatus for displacing material lying on the ground comprising running wheels on said mobile frame and having the same position relative to the latter for both operations.

4. Apparatus for displacing material lying on the ground comprising vertical axles on said supplemental frame and supporting said rake wheels, the first said means being connected to said axles for controllably rotating the same to adjust the positions of said wheels.

5. Apparatus for displacing material lying on the ground, wherein said frames are straight tubular members connected in intersecting relation, comprising a draw arm connected to said mobile frame at a position spaced from said supplemental frame.

6. Apparatus as claimed in claim 4 wherein the first said mean includes arms on said axles and a strip pivotally connected to said arms.

7. Apparatus as claimed in claim 6 wherein the second said means comprises a semi-circular strip on one of said frames and means on the other of said frames engaging said semi-circular strip.

References Cited in the file of this patent
UNITED STATES PATENTS

| | | |
|---|---|---|
| 2,447,354 | Morrill | Aug. 17, 1948 |

FOREIGN PATENTS

| | | |
|---|---|---|
| 680,537 | Great Britain | Oct. 8, 1952 |
| 1,080,088 | France | May 26, 1954 |
| 1,083,596 | France | June 30, 1954 |
| 1,084,872 | France | July 13, 1954 |
| 159,137 | Australia | Sept. 30, 1954 |